United States Patent
Zhang et al.

(10) Patent No.: US 10,259,676 B2
(45) Date of Patent: Apr. 16, 2019

(54) METHOD AND SYSTEM OF SELF-ADAPTION ADJUSTMENT FOR POST-PRINTING TREATMENT

(71) Applicant: SHENZHEN DEKIA SCIENCE AND TECHNOLOGY CO., LTD., Nanshan District, Shenzhen, Guangdong (CN)

(72) Inventors: Shumin Zhang, Guangdong (CN); Liang Xu, Guangdong (CN); Changcheng Tang, Guangdong (CN); Jian Peng, Guangdong (CN)

(73) Assignee: SHENZHEN DEKIA SCIENCE AND TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/119,780

(22) PCT Filed: Jun. 22, 2016

(86) PCT No.: PCT/CN2016/086644
§ 371 (c)(1),
(2) Date: Aug. 18, 2016

(87) PCT Pub. No.: WO2017/012446
PCT Pub. Date: Jan. 26, 2017

(65) Prior Publication Data
US 2018/0118501 A1 May 3, 2018

(30) Foreign Application Priority Data
Jul. 20, 2015 (CN) .......................... 2015 1 0427599

(51) Int. Cl.
*B41J 11/46* (2006.01)
*B65H 43/00* (2006.01)
(Continued)

(52) U.S. Cl.
CPC ............. *B65H 37/06* (2013.01); *B26D 5/007* (2013.01); *B41F 19/00* (2013.01); *B41F 23/00* (2013.01);
(Continued)

(58) Field of Classification Search
CPC .. G03G 2215/00902; B26D 5/34; B26D 5/30; B41F 33/16; B65H 43/08
See application file for complete search history.

(56) References Cited

U.S. PATENT DOCUMENTS

| 5,631,747 A | 5/1997 | Farrell et al. |
| 6,158,366 A | 12/2000 | Codos |

(Continued)

FOREIGN PATENT DOCUMENTS

| AU | 2774101 A | 7/2001 |
| AU | 2009327615 A1 | 7/2011 |

(Continued)

*Primary Examiner* — Jennifer E Simmons
(74) *Attorney, Agent, or Firm* — Carter, DeLuca & Farrell LLP

(57) ABSTRACT

A method of self-adaption adjustment for post-printing treatment including steps of S1: printing a plurality of identifiers on a paper sheet for positioning actual locations of treatment on the paper sheet; S2: detecting the identifiers on the paper sheet, and locating the actual locations to be treated according to the locations of the identifiers and/or relative locations among the identifiers; and S3: adjusting locations of treatment from a post-printing treatment mechanism to the paper sheet according to the actual locations output in step S2. A system of self-adaption adjustment for post-printing treatment including a printing module, a detection module, a treatment module, a driving module and a post-printing treatment mechanism. The method and system realize the self-adaption adjustment, which effectively solves the problems that an actual value after skewing or stretching or shrinking the actual printing content is incon- (Continued)

sistent with a theoretical value of typesetting, thus effectively improving the production efficiency and production quality, which has favorable economic and social benefits. The method and system can be widely applied in various post-printing treatment systems.

10 Claims, 3 Drawing Sheets

(51) Int. Cl.
*B65H 43/08* (2006.01)
*G03G 15/00* (2006.01)
*B26D 5/00* (2006.01)
*H04N 1/00* (2006.01)
*B41F 33/16* (2006.01)
*B65H 37/06* (2006.01)
*B41M 1/24* (2006.01)
*B41F 19/00* (2006.01)
*B41F 23/00* (2006.01)
*B65H 35/00* (2006.01)
*B41F 33/00* (2006.01)
*B41J 13/10* (2006.01)

(52) U.S. Cl.
CPC .......... *B41F 33/0036* (2013.01); *B41F 33/16* (2013.01); *B41J 11/46* (2013.01); *B41J 13/106* (2013.01); *B41M 1/24* (2013.01); *B65H 35/0006* (2013.01); *B65H 43/00* (2013.01); *B65H 43/08* (2013.01); *G03G 15/5062* (2013.01); *G03G 15/6582* (2013.01); *H04N 1/00639* (2013.01); *H04N 1/00702* (2013.01); *B65H 2301/515* (2013.01); *B65H 2301/5111* (2013.01); *B65H 2301/5121* (2013.01); *B65H 2301/5126* (2013.01); *B65H 2301/5152* (2013.01); *B65H 2511/414* (2013.01); *B65H 2511/512* (2013.01); *B65H 2801/24* (2013.01); *G03G 2215/00814* (2013.01); *G03G 2215/00877* (2013.01)

(56) References Cited

U.S. PATENT DOCUMENTS

| | | | |
|---|---|---|---|
| 6,263,816 | B1 | 7/2001 | Codos et al. |
| 7,477,859 | B2* | 1/2009 | Sakata ............... B41J 3/60 399/385 |
| 2001/0052312 | A1 | 12/2001 | Codos et al. |
| 2002/0166467 | A1 | 11/2002 | Codos et al. |
| 2004/0083862 | A1* | 5/2004 | Mikkelsen ........... B26F 1/3813 83/13 |
| 2005/0051071 | A1 | 3/2005 | Codos et al. |
| 2005/0270357 | A1* | 12/2005 | Kawai ................. B26D 5/34 347/105 |
| 2006/0210296 | A1 | 9/2006 | Sakata et al. |
| 2011/0256996 | A1 | 10/2011 | Palm et al. |
| 2012/0148326 | A1* | 6/2012 | Ipponyari ............ B26D 1/045 400/621 |
| 2013/0057930 | A1* | 3/2013 | Toki ................... B26D 9/00 358/488 |

FOREIGN PATENT DOCUMENTS

| | | |
|---|---|---|
| CA | 2397105 A1 | 7/2001 |
| CA | 2747475 A1 | 6/2010 |
| CN | 1416485 A | 5/2003 |
| CN | 1834801 A | 9/2006 |
| CN | 201456542 U | 5/2010 |
| CN | 102245389 A | 11/2011 |
| CN | 104999809 A | 10/2015 |
| DK | 2379329 T3 | 4/2016 |
| EP | 1246961 A1 | 10/2002 |
| EP | 1703320 A1 | 9/2006 |
| EP | 2379329 A1 | 10/2011 |
| IL | 150625 A | 11/2005 |
| JP | H09109505 A | 4/1997 |
| JP | 2003519511 A | 6/2003 |
| JP | 2006256019 A | 9/2006 |
| JP | 2012512766 A | 6/2012 |
| RU | 2011129604 A | 1/2013 |
| WO | 0151696 A1 | 7/2001 |
| WO | 2010071543 A1 | 6/2010 |

\* cited by examiner

METHOD AND SYSTEM OF SELF-ADAPTION ADJUSTMENT FOR POST-PRINTING TREATMENT

TECHNICAL FIELD

The present invention relates to the field of paper post-printing treatment, and more particular, to a method and system of post-printing paper treatment.

BACKGROUND

Post-printing treatment is a subsequent process for semi-finished printing products, so as for strengthening or embellishing in aspects of bookbinding, appearance, flatness, anti-fake, packing and the like. Due to the continuous development of printing industry, printed matters are subject to various different treatments, which in turn results in increasing demands for illustrating different features on the finished products. Therefore, different new types of post-printing treatments appear continuously, such as trimming, folding, creasing, laminating, binding, foil stamping, and punching etc.

In the process of printing paper, certain displacement, scaling or skewing may occur to the printed content due to mechanical stability and other reasons, which affecting the quality of post-printing treatment. For instance, after type setting, the location of the printed content on the paper should be fixed according to preset values. But the actual location of the printed content often deviates from the preset value, which may be overall skewing, overall stretch, overall shrink, and the like.

In the prior art, the editing program is overall amended via manual measurement and manual input in response to the skewing, stretch or shrink and other errors. This operation is very tedious.

SUMMARY

In order to solve the foregoing technical problems, the present invention aims at providing a method of self-adaption adjustment for post-printing treatment capable of automatically identifying a printing location and correcting a post-printing treatment error.

In order to solve the foregoing problems, the present invention aims at providing a post-printing treatment self-adaption adjustment system capable of automatically identifying a printing location and correcting a post-printing treatment error.

The present invention employs the technical solutions as follows:

A method of self-adaption adjustment for post-printing treatment including steps of S1: printing a plurality of identifiers on a paper sheet for positioning actual locations of treatment on the paper sheet; S2: detecting the identifiers on the paper sheet, and locating the actual locations to be treated according to the locations of the identifiers and/or relative locations among the identifiers; and S3: adjusting locations of treatment from a post-printing treatment mechanism to the paper sheet according to the actual locations output in step S2.

Preferably, the identifiers are black blocks. The step S1 specifically includes a sub-step of S11: printing corresponding black blocks on the paper sheet at a plurality of locations to be treated respectively, wherein the plurality of black blocks include at least one selected from a group comprising a creasing positioning black block for positioning a creasing location, a trimming positioning black block for positioning a trimming location, a perforating positioning black block for positioning a perforating location, a folding positioning black block for positioning a folding location, a strike perforating positioning black block for positioning a location of strike perforating.

Preferably, the step S2 specifically includes sub-steps of S21: scanning the black blocks on the paper sheet via a scanning head; and S22: judging actual locations of treatment on the paper sheet according to the actual locations of the black blocks and/or the actual relative locations among the black blocks.

Preferably, the step S22 specifically includes sub-steps of S221: using a detected data associated with a sideline of a single black block as an actual treatment location on the paper sheet; or S222: determining the longitudinal deflection level between a location to be treated and a theoretical location to be treated on the paper sheet according to a detected angle between a connecting line between two black blocks in a longitudinal direction and a theoretical connecting line there between, and locating an actual location to be treated on the paper according to the longitudinal deflection level.

Preferably, the post-printing treatment mechanism includes at least one selected from a group comprising a creasing mechanism, a trimming mechanism, a folding mechanism, a perforating mechanism and a strike perforating mechanism; and the treatment for the paper sheet in step S3 includes at least one selected from a group comprising a creasing treatment, a trimming treatment, a folding treatment, a perforating treatment and a strike perforating treatment.

Preferably, the creasing positioning black blocks, the trimming positioning black blacks, the perforating positioning black blocks, the folding positioning black blocks and the strike perforating positioning black blocks in step S11 have different sizes; and the step S22 further includes a sub-step S220: judging the types of the black blocks as the creasing positioning black blocks, the trimming positioning black blocks, the perforating positioning black blocks, the folding positioning black blocks or the strike perforating positioning black blocks according to the size of the black blocks.

A system of self-adaption adjustment for post-printing treatment is configured to implement the method of self-adaption adjustment for post-printing treatment. The system of self-adaption adjustment for post-printing treatment includes a printing module, configured to print a plurality of identifiers on a paper sheet for positioning actual locations of treatment on the paper sheet; a detection module, configured to detect the identifiers on the paper sheet; a treatment module, configured to locate the actual locations to be treated according to the locations of the identifiers and relative locations among the identifiers; a driving module, configured to adjust locations of treatment from a post-printing treatment mechanism to the paper sheet according to a signal associated with the actual locations from the treatment module; and a post-printing treatment mechanism, configured to perform post-printing treatment for the paper sheet.

Preferably, the identifiers are a plurality of black blocks printed on the paper sheet respectively, which include at least one selected from a group comprising a creasing positioning black block for positioning a creasing location, a trimming positioning black block for positioning a trimming location, a perforating positioning black block for positioning a perforating location, a folding positioning black block for positioning a folding location, a strike perforating positioning black block for positioning a location of strike perforating.

Preferably, the detection module is a wide-breadth scanning head.

Preferably, the post-printing treatment mechanism includes at least one selected from a group comprising a creasing mechanism, a trimming mechanism, a folding mechanism, a perforating mechanism and a strike perforating mechanism.

The present invention has advantageous effects that:

According to the present invention, a WYSIWYG self-adaption adjustment is realized by setting a plurality of identifiers on the paper sheet and locating actual locations to be treated on the paper sheet, and identifying the location of the identifiers and the location relationship among the identifiers in a post-printing treatment, which effectively solves the problems that an actual value after skewing or scaling or deflecting the actual printing content is inconsistent with a theoretical value of typesetting, thus effectively improving the production efficiency and production quality, which has favorable economic and social benefits.

The present invention can be widely applied in various post-printing treatment systems.

BRIEF DESCRIPTION OF THE DRAWINGS

The embodiments of the present invention are further described hereunder with reference to the drawings.

DETAILED DESCRIPTION

It should be noted that the embodiments in the invention can be mutually combined in case of no confliction, and the features in the embodiment can be mutually combined in case of no confliction.

Figure 1:
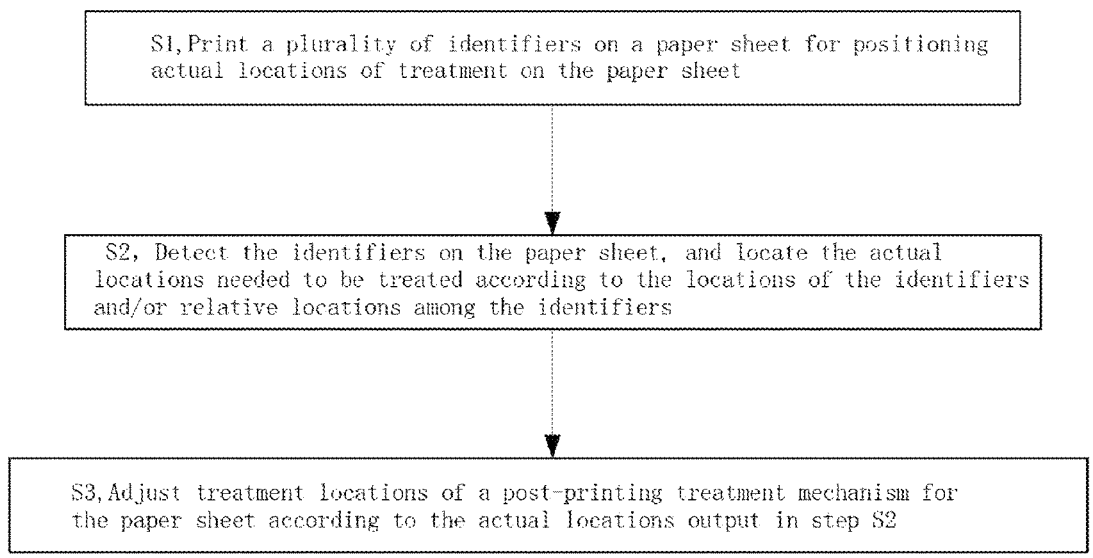
FIG. 1 is a flow diagram of one embodiment of the method of self-adaption adjustment for post-printing treatment of the present invention.

As illustrated in FIG. 1, a method of self-adaption adjustment for post-printing treatment includes the following steps of S1: printing a plurality of identifiers on a paper sheet for positioning actual locations of treatment on the paper sheet; S2: detecting the identifiers on the paper sheet, and locating the actual locations to be treated according to the locations of the identifiers and/or relative locations among the identifiers; and S3: adjusting locations of treatment from a post-printing treatment mechanism to the paper sheet according to the actual locations output in step S2.

Figure 2:
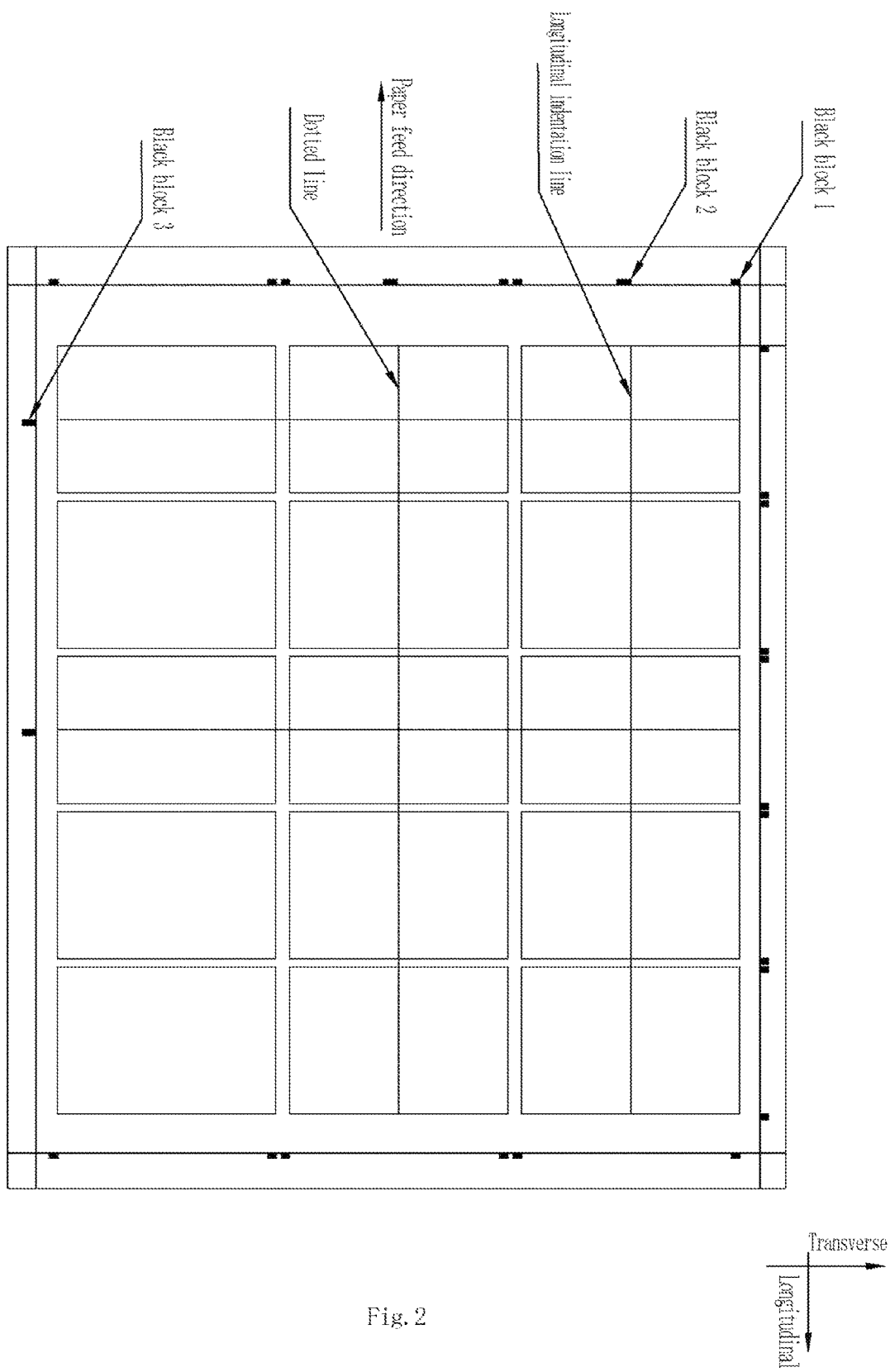
FIG. 2 is a schematic diagram of identifiers on a paper sheet of one embodiment of the method of self-adaption adjustment for post-printing treatment of the present invention.
Figure 3:
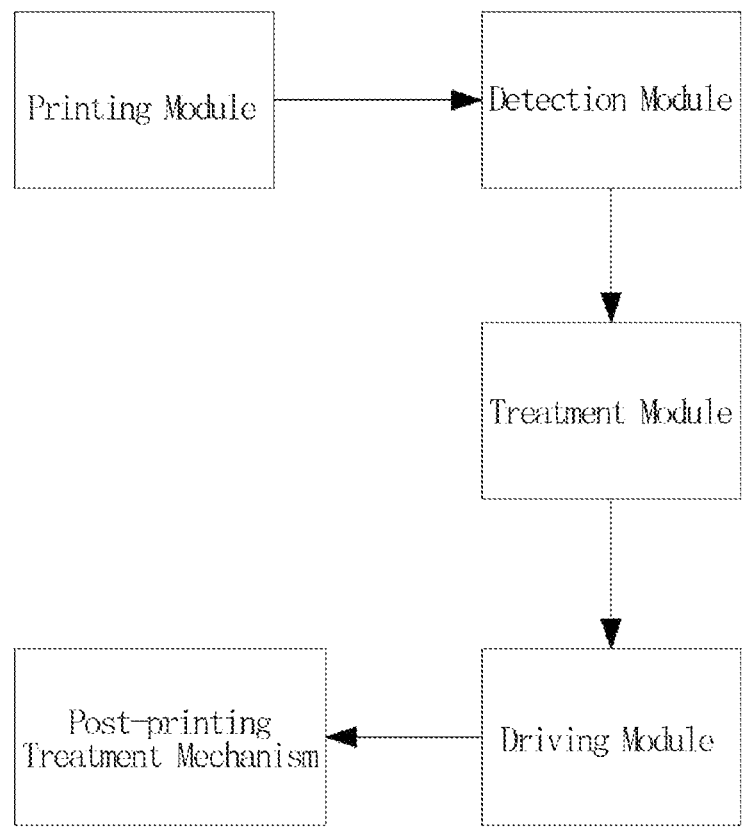
FIG. 3 is a structure diagram of one embodiment of the method of self-adaption adjustment for post-printing treatment of the present invention.

As illustrated in FIG. 2, preferably, the identifiers are black blocks. The step S1 specifically includes a sub-step of S11: printing corresponding black blocks on the paper sheet at a plurality of locations to be treated respectively, wherein the plurality of black blocks include a creasing positioning black block for positioning a creasing location, and/or a trimming positioning black block for positioning a trimming location, and/or a perforating positioning black block for positioning a perforating location, and/or a folding positioning black block for positioning a folding location, and/or a strike perforating positioning black block for positioning a location of a strike perforating. It should be noted that a same black block can also complete several positioning functions. For example, as illustrated in FIG. 2, the black block 2 is both a creasing black block for positioning a creasing location and a strike perforating black block for positioning a strike perforating location. Obviously, the type of the foregoing black blocks is merely for giving an example. There may be more types of black blocks in the present invention, as long as an actual location is self-adaption located and treated by utilizing a black block on a paper sheet, they shall all fall into the scope of the present invention.

Preferably, the step S2 specifically includes sub-steps of S21: scanning the black blocks on the paper sheet via a scanning head; and S22: judging actual locations of treatment on the paper sheet according to the actual locations of the black blocks and/or the actual relative locations among the black blocks. The step S22 specifically includes sub-steps of S221: using a detected data associated with a sideline of a single black block as an actual location of treatment on the paper sheet; or S222: determining the longitudinal deflection level between a location to be treated and a theoretical location to be treated on the paper sheet according to a detected angle between a connecting line between two black blocks in a longitudinal direction and a theoretical connecting line there between, and locating an actual location to be treated on the paper according to the longitudinal deflection level.

Preferably, the post-printing treatment mechanism includes at least one selected from a group comprising a creasing mechanism, a trimming mechanism, a folding mechanism, a perforating mechanism and a strike perforating mechanism; and the treatment for the paper sheet in step S3 includes at least one selected from a group comprising a creasing treatment, a trimming treatment, a folding treatment, a perforating treatment and a strike perforating treatment.

Preferably, the creasing positioning black blocks, the trimming positioning black blacks, the perforating positioning black blocks, the folding positioning black blocks and the strike perforating positioning black blocks in step S11 have different sizes; and the step S22 further includes a sub-step S220: judging the types of the black blocks as the creasing positioning black blocks, the trimming positioning black blocks, the perforating positioning black blocks, the folding positioning black blocks or the strike perforating positioning black blocks according to the size of the black blocks.

To be specific, as illustrated in FIG. 2, the paper sheet is printed with a plurality of black blocks. Each black block is in a rectangle structure. The type of the black block can be identified by identifying the actual size of various black blocks. For example, the black block 1 is a trimming positioning black block as the longitudinal edge thereof is configured to align with the actual trimming location; the black block 2 is a creasing positioning black block as the longitudinal edge thereof is configured to align with a longitudinal creasing line, meanwhile, the black block 2 is also a strike perforating positioning black block as the transverse edge of the black block 2 is configured to align with a strike perforating location; the black block 3 is a creasing positioning black block as the transverse edge thereof is configured to align with a transverse creasing line, meanwhile, the black block 3 is also a strike perforating positioning black block as the longitudinal edge of the black block 3 is configured to align with a strike perforating location. If the paper sheet transversely or longitudinally shifts during printing, the location of each black block will also shift in a corresponding manner, and the actual location of treatment of the paper sheet can be located by identifying the actual location of each black block; if scaling appears on the paper sheet during printing, the size of each black block or the relative locations among the black blocks will also be scaled in a corresponding manner, and the actual location of treatment of the paper sheet can be located by identifying the actual location of each black block; if the paper is transversely or longitudinally skewed during printing, the relative locations among the black blocks in a corresponding direction will also be skewed in a corresponding manner, and the skew in locations to be treated can be rectified by identifying the amount of skew among the black blocks.

A system of self-adaption adjustment for post-printing treatment is configured to implement the method of self-adaption adjustment for post-printing treatment. The system of self-adaption adjustment for post-printing treatment includes a printing module, configured to print a plurality of identifiers on a paper sheet for positioning actual locations of treatment on the paper sheet; a detection module, configured to detect the identifiers on the paper sheet; a treatment module, configured to locate the actual locations to be treated according to the locations of the identifiers and relative locations among the identifiers; a driving module, configured to adjust locations of treatment from a post-printing treatment mechanism to the paper sheet according to a signal associated with the actual locations from the treatment module; and a post-printing treatment mechanism, configured to perform post-printing treatment for the paper sheet.

Preferably, the identifiers are a plurality of black blocks printed on the paper sheet respectively, which include at least one selected from a group comprising a creasing positioning black block for positioning a creasing location, a trimming positioning black block for positioning a trimming location, a perforating positioning black block for positioning a perforating location, a folding positioning black block for positioning a folding location, a strike perforating positioning black block for positioning a location of strike perforating.

Preferably, the detection module is a wide-breadth scanning head.

Preferably, the post-printing treatment mechanism includes at least one selected from a group comprising a creasing mechanism, a trimming mechanism, a folding mechanism, a perforating mechanism and a strike perforating mechanism. Obviously, the post-printing treatment mechanism not only includes the foregoing listed mechanisms, but it should be understood as any post-printing treatment mechanism performing positioning and treatment for a paper sheet.

According to the present invention, a WYSIWYG self-adaption adjustment is realized by setting a plurality of identifiers on the paper sheet and locating actual locations to be treated on the paper sheet, and identifying the location of the identifiers and the location relationship among the identifiers in a post-printing treatment, which effectively solves the problems that an actual value after skewing or scaling or deflecting the actual printing content is inconsistent with a theoretical value of typesetting, thus effectively improving the production efficiency and production quality, which has favorable economic and social benefits.

The above is a specific description for the preferred embodiments of the present invention, but the present invention is not intended to be limited by the foregoing embodiments. Various equivalent transformations or replacements can further be made by those skilled in the art without departing from the spirit of the present invention and shall all fall into the scope defined by the claims.

The invention claimed is:

1. A method of self-adaption adjustment for post-printing treatment, the method comprising:
    S1: printing a plurality of identifiers on a paper sheet for positioning actual locations of treatment on the paper sheet;
    S2: detecting the identifiers on the paper sheet, and locating the actual locations to be treated according to at least one of: the locations of the identifiers or relative locations among the identifiers; and
    S3: adjusting locations of treatment from a post-printing treatment mechanism to the paper sheet according to the actual locations output in step S2,
    wherein the identifiers are black blocks,
    wherein the step S1 includes a sub-step comprising:
        S11: printing corresponding black blocks on the paper sheet at a plurality of locations to be treated respectively, wherein the plurality of black blocks include a creasing positioning black block for positioning a creasing location, a trimming positioning black block for positioning a trimming location, a perforating positioning black block for positioning a perforating location, a folding positioning black block for positioning a folding location, and a strike perforating positioning black block for positioning a location of strike perforating, and
    wherein the step S2 includes sub-steps comprising:
        S21: scanning the black blocks on the paper sheet via a scanning head, and
        S22: judging actual locations of treatment on the paper sheet according to at least one of actual locations of the black blocks or actual relative locations among the black blocks.

2. The method of self-adaption adjustment for post-printing treatment according to claim 1, wherein the step S22 includes sub-steps comprising:
    S221: using a detected data associated with a sideline of a single black block as an actual treatment location on the paper sheet; or
    S222: determining a longitudinal deflection level between a location to be treated and a theoretical location to be treated on the paper sheet according to a detected angle between a connecting line between two black blocks in a longitudinal direction and a theoretical connecting line there between, and locating an actual location to be treated on the paper according to the longitudinal deflection level.

3. The method of self-adaption adjustment for post-printing treatment according to claim 2, wherein the creasing positioning black blocks, the trimming positioning black blacks, the perforating positioning black blocks, the folding positioning black blocks and the strike perforating positioning black blocks in step S11 have different sizes; and the step S22 further includes a sub-step of:
    S220: judging the types of the black blocks as the creasing positioning black blocks, the trimming positioning black blocks, the perforating positioning black blocks, the folding positioning black blocks or the strike perforating positioning black blocks according to the size of the black blocks.

4. The method of self-adaption adjustment for post-printing treatment according to claim 1, wherein the post-printing treatment mechanism includes at least one selected from a group comprising a creasing mechanism, a trimming mechanism, a folding mechanism, a perforating mechanism and a strike perforating mechanism; and the treatment for the paper sheet in step S3 includes at least one selected from a group comprising a creasing treatment, a trimming treatment, a folding treatment, a perforating treatment and a strike perforating treatment.

5. The method of self-adaption adjustment for post-printing treatment according to claim 4, wherein the creasing positioning black blocks, the trimming positioning black blacks, the perforating positioning black blocks, the folding positioning black blocks and the strike perforating positioning black blocks in step S11 have different sizes; and the step S22 further includes a sub-step of:

S220: judging the types of the black blocks as the creasing positioning black blocks, the trimming positioning black blocks, the perforating positioning black blocks, the folding positioning black blocks or the strike perforating positioning black blocks according to the size of the black blocks.

6. The method of self-adaption adjustment for post-printing treatment according to claim 1, wherein the creasing positioning black blocks, the trimming positioning black blacks, the perforating positioning black blocks, the folding positioning black blocks and the strike perforating positioning black blocks in step S11 have different sizes; and the step S22 further includes a sub-step of:

S220: judging the types of the black blocks as the creasing positioning black blocks, the trimming positioning black blocks, the perforating positioning black blocks, the folding positioning black blocks or the strike perforating positioning black blocks according to the size of the black blocks.

7. A system of self-adaption adjustment for post-printing treatment comprising:
   a printing module, configured to print a plurality of identifiers on a paper sheet for positioning actual locations of treatment on the paper sheet;
   a detection module, configured to detect the identifiers on the paper sheet;
   a treatment module, configured to locate the actual locations to be treated according to the locations of the identifiers and relative locations among the identifiers;
   a driving module, configured to adjust locations of treatment from a post-printing treatment mechanism to the paper sheet according to a signal associated with the actual locations from the treatment module; and
   a post-printing treatment mechanism, configured to perform post-printing treatment for the paper sheet,
   wherein the identifiers are a plurality of black blocks printed on the paper sheet respectively, which include a creasing positioning black block for positioning a creasing location, a trimming positioning black block for positioning a trimming location, a perforating positioning black block for positioning a perforating location, a folding positioning black block for positioning a folding location, and a strike perforating positioning black block for positioning a location of strike perforating, and
   wherein the detection module is a wide-breadth scanning head to scan the black blocks on sheet.

8. The system of self-adaption adjustment for post-printing treatment according to claim 7, wherein the post-printing treatment mechanism includes at least one selected from a group comprising a creasing mechanism, a trimming mechanism, a folding mechanism, a perforating mechanism and a strike perforating mechanism.

9. The system of self-adaption adjustment for post-printing treatment according to claim 7, wherein the post-printing treatment mechanism includes at least one selected from a group comprising a creasing mechanism, a trimming mechanism, a folding mechanism, a perforating mechanism and a strike perforating mechanism.

10. The system of self-adaption adjustment for post-printing treatment according to claim 7, wherein the post-printing treatment mechanism includes at least one selected from a group comprising a creasing mechanism, a trimming mechanism, a folding mechanism, a perforating mechanism and a strike perforating mechanism.

* * * * *